J. TEDELL.
CORN PLANTER CLUTCH MECHANISM.
APPLICATION FILED MAY 5, 1910.

1,170,785.

Patented Feb. 8, 1916.
4 SHEETS—SHEET 3.

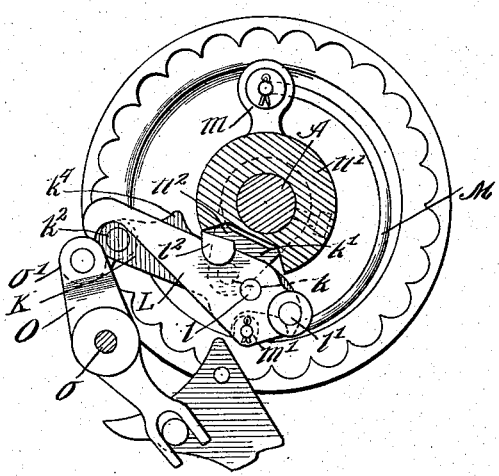

UNITED STATES PATENT OFFICE.

JOHN TEDELL, OF MOLINE, ILLINOIS, ASSIGNOR TO ROCK ISLAND PLOW COMPANY, OF ROCK ISLAND, ILLINOIS, A CORPORATION OF ILLINOIS.

CORN-PLANTER CLUTCH MECHANISM.

1,170,785.  Specification of Letters Patent.  Patented Feb. 8, 1916.

Application filed May 5, 1910. Serial No. 559,466.

*To all whom it may concern:*

Be it known that I, JOHN TEDELL, a citizen of the United States of America, and resident of Moline, Rock Island county, Illinois, have invented a certain new and useful Improvement in Corn-Planter Clutch Mechanisms, of which the following is a specification.

My invention relates to corn planter clutch mechanism of that class in which a wire is stretched across the field in the line of the hills to be planted, having knots thereon at the points where the corn is to be planted, which knots engage and actuate a fork or lever to lock the driving mechanism to the seed-dropping mechanism, whereby the seed is planted at the desired intervals. The means by which this result is accomplished is generally known as a corn planter clutch, and my invention specifically relates to improvements in this clutch. The wire stretched across the field is embraced by the forked upper end of the lever arm known as the tappet, so that the knot of the wire engages this tappet, moving it rearwardly in the advance of the machine, thus rotating a shaft to which the lower end of the tappet is connected. Another shaft is connected with the seed-dropping mechanism, which is adapted to be locked into engagement with mechanism constantly driven by the traction wheels or other suitable part of the machine. When the tappet shaft is moved by the engagement of the tappet with the wire, in the advance of the planter, its movement serves to actuate clutch mechanism which connects the seed-dropping shaft with the driving mechanism, thus rotating the seed-dropping shaft one revolution, when the clutch is automatically disengaged from the driving mechanism, thus permitting it, and the seed-dropping mechanism operated thereby, to remain idle until the tappet is again engaged by another knot on the wire.

The object of my invention is to provide a clutch which shall be positive in its action of engagement and disengagement, and which shall always and invariably remain engaged or disengaged, as the case may be.

Figure 1:
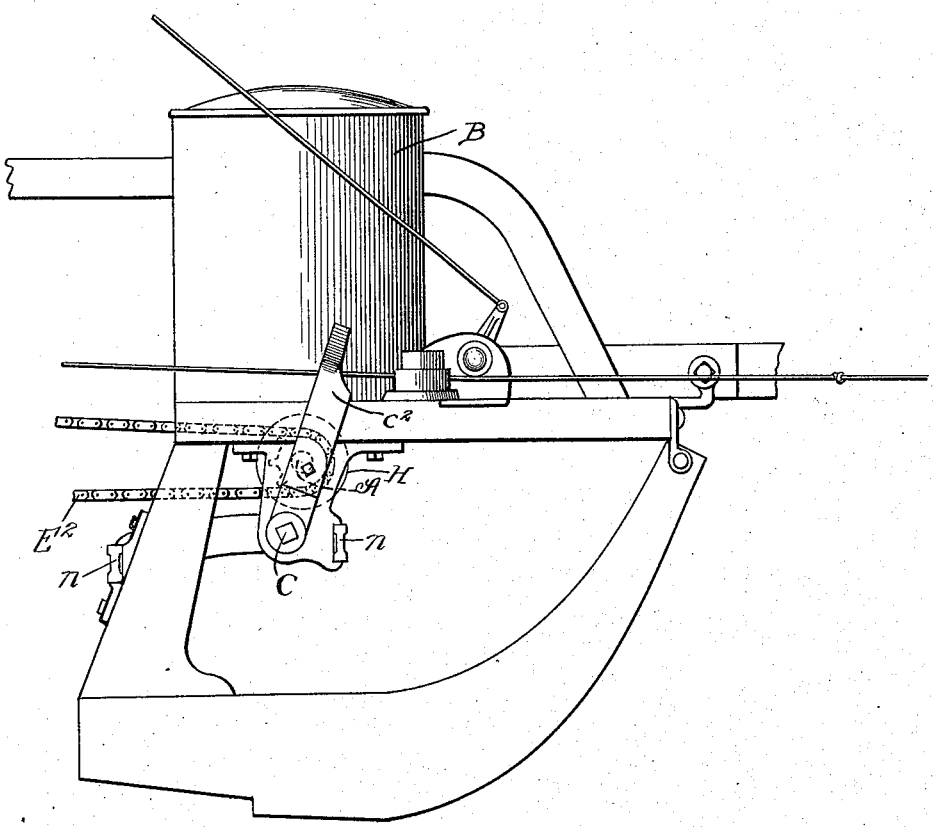
Figure 2:
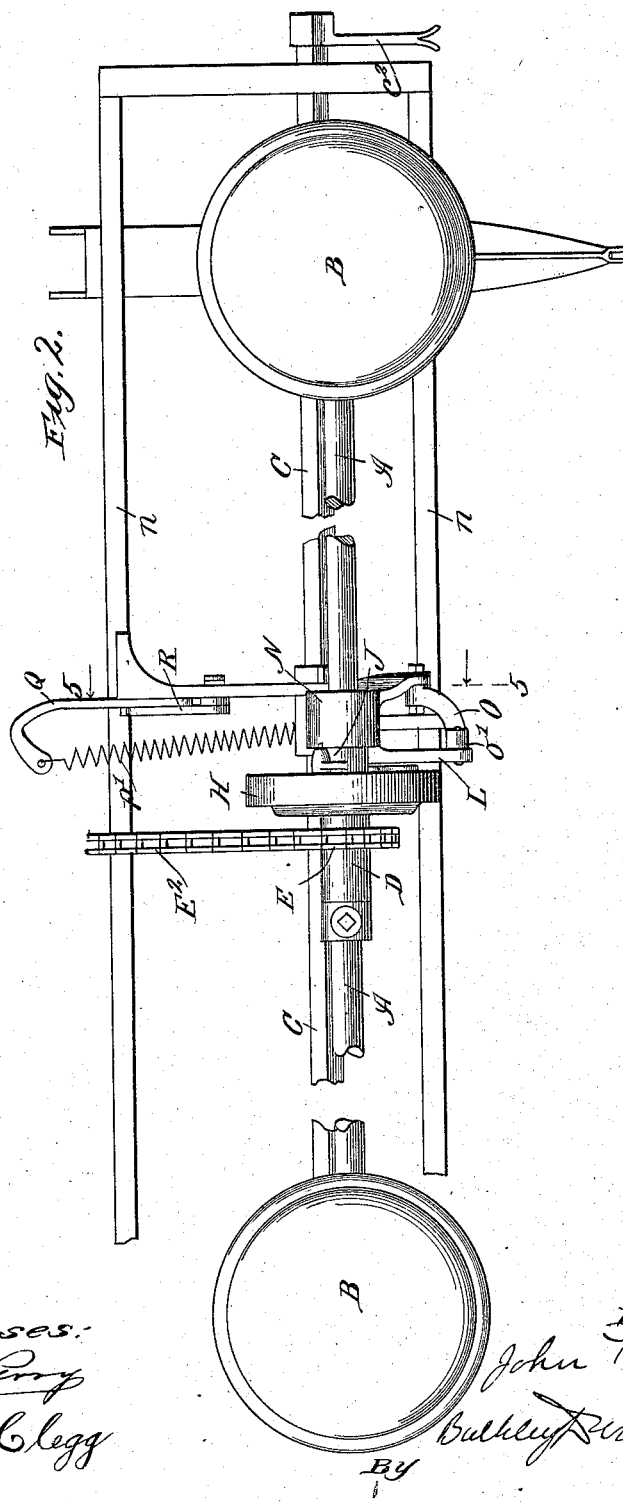
Figure 3:
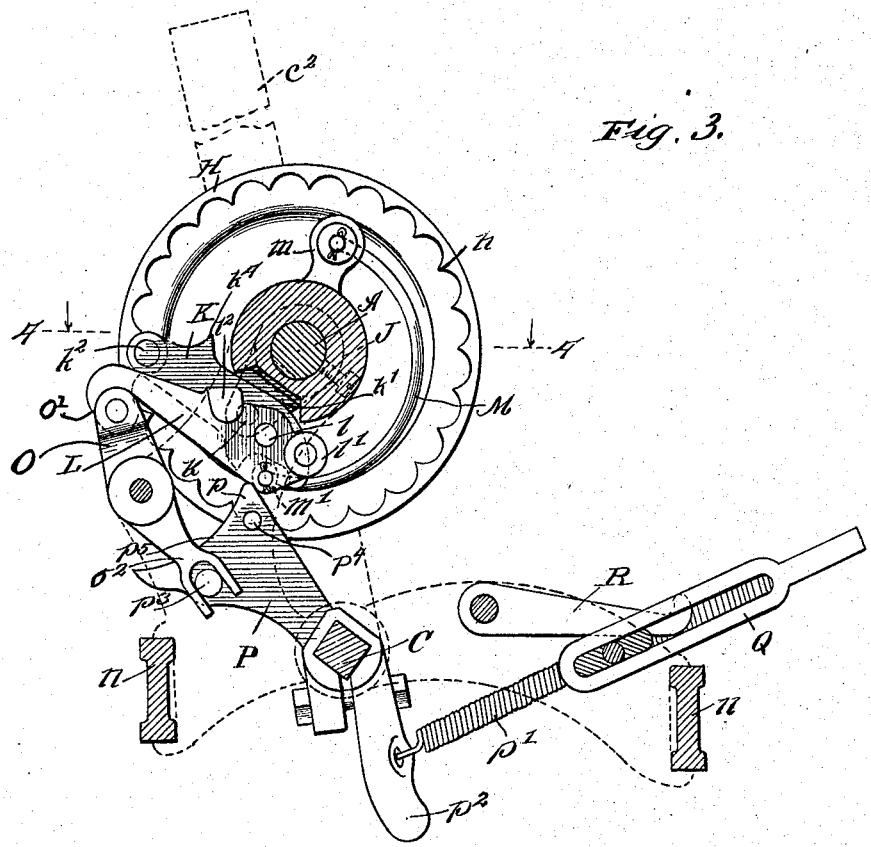
Figure 4:
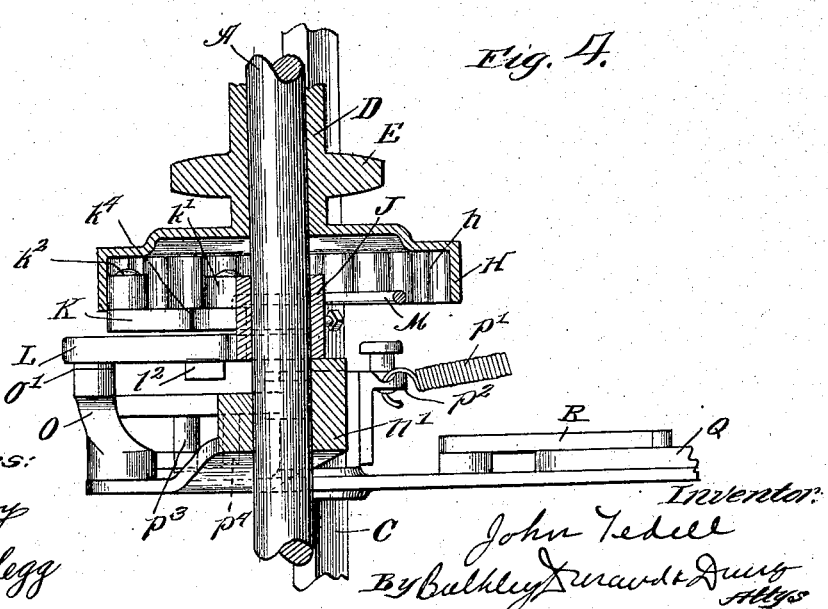

Reference may now be had to the accompanying drawings, in which:

Figure 1 is a side view of the front portion of a planter in connection with which my improved clutch is employed, only such portions of the planter being illustrated as are necessary to describe and claim the improvement. Fig. 2 is a plan view of the same. Fig. 3 is a cross-sectional view on line 5—5 of Fig. 2. Fig. 4 is a section on line 4—4 in Fig. 3, illustrating a portion of the seed shaft with the clutch and driven member and other parts of the clutch mechanism partly in section. Fig. 5 is a cross-sectional view similar to Fig. 3, illustrating the position of the clutch when engaged to operate the seed shaft. Fig. 6 is a like view showing the clutch in the act of disengagement from operation of the seed shaft. Fig. 7 is a detail view of the engaging and disengaging pawl or dog.

I have illustrated and shall describe that portion of the corn planter which is essential to present the improvements constituting my invention.

The seed shaft for driving the rotary seed mechanism is designated at A, the seed mechanism, of usual and well known construction, being contained within the seed boxes B. Below the seed shaft A is the check-row shaft C, at each end of which a check-row fork $C^2$ is rigidly secured. Mounted upon the seed shaft A is a sleeve D carrying a sprocket wheel E driven by a sprocket chain $E^2$ from the ground wheels of the planting machine, in the usual manner. Also rigidly mounted upon the sleeve D is a clutch wheel H, the outer periphery of which is smooth, and having clutch teeth $h$ formed upon its inner periphery. (Figs. 3, 4, 5 and 6.)

It will be observed, by reference to Fig. 4 more particularly, that the clutch wheel H is mounted upon the sleeve D independent of other parts of the mechanism to be described, so that it is capable of revolving idly about and upon the seed shaft A. Therefore, means must be provided for engaging and locking the clutch-wheel thus driven from and by the ground wheels of the machine to the seed shaft in order to rotate the seed shaft and operate the seed mechanism at the proper time and in the proper manner to deliver the kernels of seed in the required number from the seed boxes in which the seed is contained. The mechanism for engaging and disengaging the clutch wheel H, and maintaining such engagement and disengagement, is all mounted upon a hub J, which hub is rigidly secured to the seed shaft A; so that engaging mechanism between the clutch wheel H and the hub J will, when in engagement with that clutch wheel, connect the seed shaft A with the sprocket wheel E driven from the ground wheels of the machine, whereby a movement of rotation is imparted to the seed shaft A to operate the seed mechanism. A clutch wheel dog or pawl K is pivoted at $k$ upon a projection $k'$ from the hub J, and the disengaging pawl or dog L is loosely pivoted upon an axial pin $l$ projecting from the lower end of the clutch wheel pawl K. A spring M is secured at one end to a projection $m$ from the hub J and at the other end to the disengaging pawl L at $m'$ near the pivot of said disengaging pawl. The upper portion of the disengaging pawl is formed into a hooked end, and the lower end of the said pawl carries an anti-friction bearing or roll $l'$. The hub J is interposed between the clutch wheel H and the bracket bearing N, which latter is rigidly secured to the parallel box rails $n$, in the usual and well known manner. The dog L is provided with a lug $l^2$ which is adapted to move along the periphery of the hub portion $n'$ of the bracket bearing N to keep the roll or other anti-friction engaging portion $k^2$ of the dog K in engagement with the teeth $h$ of the clutch wheel. The hub portion $n'$ is provided on its lower side with an opening or notch $n^2$ into which the lug $l^2$ can move to permit the dog K to disengage from the clutch wheel, as will hereinafter more fully appear. It will be seen that the portion $m'$ to which the spring M is secured, and which is rigid with the dog L, is adapted to engage in a wide notch $k^3$ on the lower edge of the dog K, whereby movement of the dog L, in either direction about its pivot $l$, serves to actuate the dog K to either open or close the clutch. The dog K has a projection $k^4$ that strikes the hub J when the clutch is opened, as shown in Fig. 6. In Fig. 3 the clutch is shown in a closed condition, the roll or engaging portion $k^2$ being in locking engagement with a notch $h$ on the clutch wheel. In such condition the portion $m'$ is about at the center of the wide notch $k^3$, as shown more clearly in Fig. 7. An arm or lever O is pivoted at $o$ upon the bracket bearing N, and is provided with a roll or other suitable engaging portion $o'$ adapted to be engaged by the hook-shaped end portion of the dog L, as shown in Fig. 3. When this occurs, the dog L is forced upwardly about its pivot $l$, as shown in Fig. 5, and at this time the said dog L moves alone and without moving the dog K. This lost motion is due, it will be seen, to the width of the notch $k^3$, the lug $m'$ being required to move some distance before it strikes the portion $k^5$, see Figs. 3 and 7. However, when this occurs the dog K is disengaged, as shown in Fig. 6, and in this position the spring holds the portion $k^4$ against the periphery of the hub J, as shown in Fig. 6. Thus the spring M is capable of holding the dogs in either position—that is to say, either in the position shown in Fig. 3 or the position shown in Fig. 6, because the point $m'$ travels from one side to the other of the center $l$. Thus the one spring is sufficient to hold the clutch either open or closed, and with the lost motion obtained by the provision of the wide notch $k^3$, this throw of the spring from one side of the center to the other is obtained with only a relatively slight movement on the part of the roll or engaging portion $k^2$, as will be seen by comparing Fig. 3 with Fig. 6, it being observed that this engaging portion of the dog K moves only a slight distance away from the teeth of the clutch wheel when the clutch is opened. Thus by the preliminary movement of the dog L, which is independent of the dog K, a sufficient movement is obtained, in addition to the final movement of both dogs, to carry the portion $m'$ past the center, thereby allowing the spring to lock the parts in the position shown in Fig. 6.

The means for closing the clutch, when the fork on the rock shaft C is engaged by a knot on the wire, are as follows: The said rock shaft is provided with a cam arm P which has an upper corner portion $p$ adapted to engage the roll or anti-friction bearing $l'$ on the dog L, when the shaft is rocked. A spring $p'$ is provided and connected with the lower portion $p^2$ of the arm P, the other end of said spring being suitably connected with the bracket bearing N, or with any other portion of the frame of the machine. This spring keeps the arm P, and also the check-row forks or arms $c^2$, normally in the positions shown in Fig. 3. The arm P is also provided with a pin or engaging portion $p^3$, adapted to engage the forked lower end portion $o^2$ of the arm O, whereby the latter is rocked when the rock shaft is rocked by the engagement of the check-row fork with a knot on the wire. Suitable means are provided, comprising an adjustable member Q to which one end of the spring is secured, for adjusting the tension of said spring. There is also a hook R, which is pivoted on the bracket bearing N, for engaging the pin $p^4$ on the arm P, whereby the mechanism may be locked in condition for drilling, the portion $o'$ at such time being held out of the path of the hook-shaped end portion of the dog L, thus preventing the clutch from being automatically opened.

When a knot on the check-row wire strikes the fork $c^2$ on the rock shaft C, the portion $p$ of the arm P is caused to engage the roll or anti-friction bearing $l'$, the parts at such time being in the position shown in Fig. 6. This causes the portion $m'$ to move along until it engages the outer side of the notch $k^3$, and as this brings the spring into position to pull at the other side of the center $l$, it follows that the tension of the spring is then exerted to pull the engaging portion $k^2$ of the dog K into engagement with the teeth $h$ on the inner circumference of the clutch H, as shown in Fig. 3. At such time, of course, the portion $o'$ has been carried out of the path of the dog L, and the pressure of the arm P against the portion $l'$ produces a preliminary movement of the seed shaft A. The clutch being closed in this manner, the seed shaft A is then rotated by the transmission of power through the sprocket chain $E^2$ from the ground wheel. The rotation of the shaft in this manner operates the seed mechanisms in the seed boxes B with the result that the required number of kernels of corn are dropped in the boots of the runners of the machine, in the usual and well understood manner. When the proper number of kernels have been dropped, the dog L strikes the upper end of the arm O, with the result previously explained, to-wit: That the portion $m'$ moves over until it engages the portion $k^5$ on the dog K, thus causing the parts to be automatically and partially opened as shown in Fig. 5. Also, as previously explained, this movement is sufficient to bring the spring to the other side of the center $l$, permitting it to pull the dogs upwardly and into the positions shown in Fig. 6, thus completely opening the clutch. This causes the seed shaft to stop rotating, and it and the seed mechanisms in the seed boxes remain inactive until the check-row fork encounters another knot on the wire.

During rotation of the shaft it will be seen that the lug $l^2$ is in engagement with or near the periphery of the bearing $n'$, so that the clutch cannot be opened, should anything accidentally strike the dog L; but when the lug moves around to the position opposite the notch $n^2$, the condition is such that the clutch can then be opened by the striking of the dog L against the upper end of the arm O. It is an important consideration of my invention that this arm O, which acts as a stop for automatically opening the clutch, is pivoted upon the bracket bearing N, and is not mounted upon the rock shaft. It follows from this arrangement that the stop or obstruction encountered by the dog L, at the proper time for opening the clutch, is of a positive and certain character, and that the opening of the clutch in this manner cannot possibly fail, even when the machine is working under a heavy load. In other words, with the provision of my improved construction of clutch mechanism, what has heretofore been known as skipping cannot possibly occur, as the clutch is sure to open once for each rotation of the seed shaft. Furthermore, and as previously mentioned, the preliminary motion of the dog L, without moving the dog K, is also important, as it enables the spring M to shift from one side to the other of the center before the clutch is opened, or at least very nearly so, thus making the movement of the dog K comparatively slight. In addition, this preliminary movement of the dog L, without moving the dog K, prevents shock and renders the opening of the clutch much easier and more certain in character. When the dog L strikes the stop O, the impact is of a yielding nature, inasmuch as it is taken up by the spring M, and by the preliminary movement of the dog L against the tension of said spring, and without moving any other parts. In other words, a cushioning effect is obtained, which tends to prevent breakage and undue wear on the parts, and which renders the action of a clutch of this kind much more satisfactory and reliable than hertofore.

When the machine is used for drilling, the rock shaft C is locked in its rocked position by the engagement of the hook R with the pin $p^4$ on the arm P in a manner that will be readily understood. At such time the arm P is in such a position that its curved upper edge $p^5$ engages the anti-friction bearing $l'$ each time the dog L passes beneath the seed shaft. While this engagement is taking place, there is no danger of the dog L being actuated, as by accidentally striking some portion of the machinery or mechanism, and of thereby opening the clutch. In other words, while the roll $l'$ is traveling along the curved surface $p^5$, the clutch is locked closed. This is important, it will be seen, for at this time the lug $l^2$ is opposite the notch $n^2$ and any accidental engagement of the dog L with some object at such time might serve to open the clutch, thereby interrupting the drilling operation. The arrangement described, however, entirely precludes any such accidental opening of the clutch while the machine is being used for drilling. Also, at this time the arm or stop O is held out of the path of the dog L, by the arm P, in the manner shown.

What I claim as my invention is:

1. In a planter, a rotary shaft, a clutch member which is loose on said shaft, a connection for driving said clutch member, said clutch member being provided internally with an endless series of notches, a rotary element connected to the shaft, a pivoted dog on said rotary element, adapted to engage said notches, a spring adapted to hold said dog either in or out of said notches, a pivoted element associated with said dog, a rock shaft provided with means for engaging said pivoted element to cause the dog to engage one of said notches, means for engaging said pivoted element to disengage the dog from said notches, and means for preventing disengagement of the dog from the notches until the shaft reaches a predetermined point in its rotation.

2. In a planting machine, a rotary shaft, a clutch member which is loose on said shaft, a connection for driving said member, a hub on said shaft, a pivoted dog on said hub, said dog adapted to engage the interior of said clutch member to enable the latter to rotate the hub, a pivoted element associated with said dog, said pivoted element being provided with a hook-shaped portion at one end and a roll at the other end thereof, a lever provided with means for engaging said hook-shaped portion to throw the dog out of engagement with the clutch member, a rock shaft provided with means for engaging said roll to throw the dog into engagement with the clutch member, a spring adapted to hold the dog either in or out of engagement with the clutch member, and means for moving said lever out of the path of the hook-shaped portion when the rock shaft is actuated.

3. In a planting machine, a rotary shaft, a clutch member which is loose on said shaft, a connection for driving said member, a hub on said shaft, a pivoted dog on said hub, said dog adapted to engage the interior of said clutch member to enable the latter to rotate the hub, a pivoted element associated with said dog, said pivoted element being provided with a hook-shaped portion at one end and a roll at the other end thereof, a lever provided with means for engaging said hook-shaped portion to throw the dog out of engagement with the clutch member, a rock shaft provided with means for engaging said roll to throw the dog into engagement with the clutch member, a spring adapted to hold the dog either in or out of engagement with the clutch member, means for moving said lever out of the path of the hook-shaped portion when the rock shaft is actuated, and means for locking the rock shaft in its actuated position, whereby the dog will remain in engagement with the clutch member.

4. In a corn planter clutch mechanism, a clutch wheel, a dog for engaging said wheel, a spring operative to hold the dog either out or in, and means for initially operating said dog upon each rotation of the clutch wheel.

5. In a corn planter clutch mechanism, a clutch wheel provided with a flange having teeth on the inner circumference thereof, a dog for engaging said teeth, a spring inclosed in said wheel and operative to hold the dog either out or in, and means for initially operating said dog upon each rotation of the clutch wheel.

6. In a corn planter clutch mechanism, a clutch wheel, a dog for engaging said wheel, a second dog for actuating the said dog, a lost-motion connection between said dogs, a spring for the second dog, operative to hold the first dog either out or in, and a stop for engaging the second dog to open the clutch.

7. The combination, in a ground clutch mechanism, of a clutch wheel, a dog for engaging said wheel, a spring operative to hold the dog either out or in, and a connection for rotating said wheel.

8. The combination, in a clutch mechanism, of a clutch wheel provided with a flange having teeth on the inner circumference thereof, a dog for engaging said teeth, a spring inclosed in said wheel and operative to hold the dog either out or in, and a connection for rotating said wheel.

9. The combination, in a clutch mechanism, of a clutch wheel, a dog for engaging said wheel, a second dog for actuating the said dog, a lost-motion connection between said dogs, a spring for the second dog, operative to hold the first dog either out or in, a stop for engaging the second dog to open the clutch, and a connection for rotating said wheel.

10. In a corn clutch mechanism, a clutch wheel, a dog for engaging said wheel, a second dog for controlling said dog, a spring for the second dog, a connection between said dogs permitting initial movement of the second without movement of the first, means for engaging said second dog to open the clutch, a connection for rotating said wheel, and a shaft to be rotated by the engagement of the first dog with the clutch wheel, said connection between the dogs permitting the spring to hold the first dog either out or in, with only slight movement of the latter.

11. In a corn planter clutch mechanism, a clutch wheel, a dog for engaging said wheel, a second dog for actuating the said dog, a spring for the second dog, and a stop for engaging said second dog to open the clutch, there being a connection between the two dogs, to permit initial movement of the second dog without moving the first dog, whereby the engagement with the stop is cushioned, said spring being operative to hold the first dog either out or in.

12. In a corn planter clutch mechanism, a clutch wheel, a dog for engaging said wheel, a second dog for actuating the said dog, a shaft, a bearing for supporting said shaft, means on said second dog for engaging said bearing to keep the first dog locked in engagement with the clutch wheel, and a stop for engaging said second dog to open the clutch, said bearing having means for permitting said stop to actuate the second dog.

13. In a corn planter clutch mechanism, a clutch wheel, a dog for engaging said wheel, a second dog for actuating the said dog, a shaft, a bearing for supporting said shaft, means on said second dog for engaging said bearing to keep the first dog locked in engagement with the clutch wheel, a stop for engaging said second dog to open the clutch, said bearing having means for permitting said stop to actuate the second dog, a connection for rotating said clutch wheel, and a spring for holding said first dog either out or in.

14. In a corn planter, a clutch mechanism, a positive stop, means for engaging said stop to open the clutch, and means including a spring for cushioning the impact on said stop before the clutch is opened.

15. In a corn planter clutch mechanism, a clutch wheel, a dog for engaging said wheel, a second dog for actuating said first dog, a rock shaft, means on said rock shaft for engaging said second dog to close the clutch, and a stop for engaging said second dog to open the clutch.

16. In a corn planter clutch mechanism, a dog for opening and closing the clutch, means permitting actuation of said dog only at a certain point to open the clutch, and means for preventing such actuation when the machine is used for drilling, said means comprising a curved track or way, and means on said dog to engage said track or way while the dog is passing said point.

17. In a corn planter clutch mechanism, a clutch wheel, a dog for engaging said wheel, means for connecting the dog with a shaft, a second dog pivoted on the first dog, so that the two dogs have non-coincident axes, and devices for engaging the second dog to alternately open and close the clutch.

Signed by me at Rock Island, Illinois, this 30th day of April, 1910.

JOHN TEDELL.

Witnesses:
LUCIA TULLER,
H. DETJENS.

Copies of this patent may be obtained for five cents each, by addressing the "Commissioner of Patents. Washington, D. C."